Figure 1:
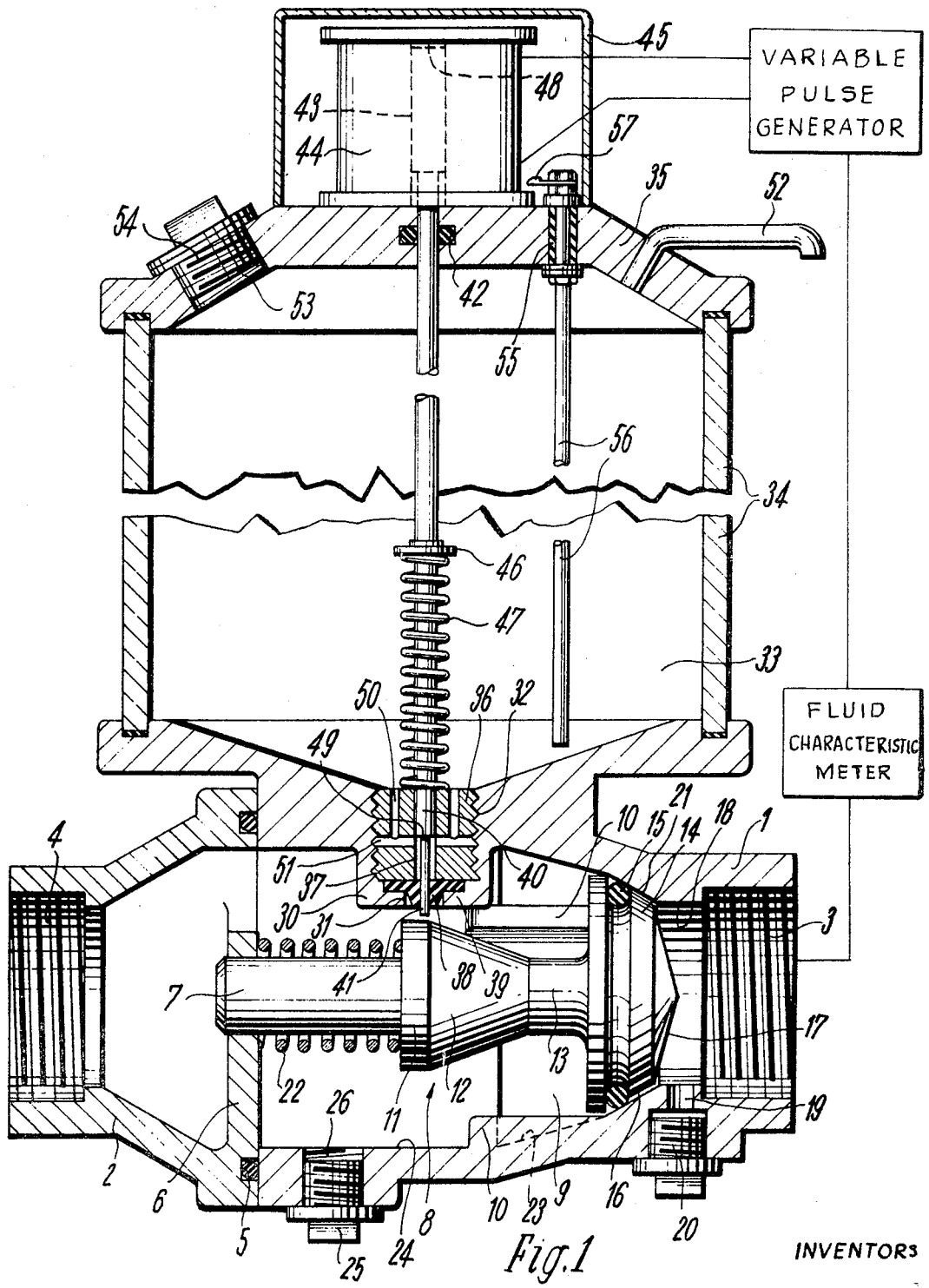

United States Patent
Schuler et al.

[15] 3,667,495
[45] June 6, 1972

[54] PROPORTIONING DEVICE, ESPECIALLY FOR WATER TREATMENT SYSTEMS

[72] Inventors: Hansjorg Schuler, Waldrems; Hartmut Dopslaff, Winnenden, both of Germany

[73] Assignee: Julius Dopslaff KG, Winnenden, Germany

[22] Filed: Mar. 20, 1970

[21] Appl. No.: 21,460

[30] Foreign Application Priority Data

Feb. 16, 1970    Sweden..................................1914/70

[52] U.S. Cl..................................137/101.21, 137/101.31
[51] Int. Cl...................................G05d 11/035, G05d 11/13
[58] Field of Search............137/88, 87, 98, 99, 100, 101.21, 137/101.31

[56] References Cited

UNITED STATES PATENTS

| | | | |
|---|---|---|---|
| 2,903,008 | 9/1959 | Abbadessa | 137/99 |
| 3,010,404 | 11/1961 | Anderson | 137/99 X |
| 3,240,222 | 3/1966 | Heil | 137/87 |
| 3,396,740 | 8/1968 | Olson | 137/87 |

FOREIGN PATENTS OR APPLICATIONS 850,199    10/1960    Great Britain.......................137/100

Primary Examiner—Samuel B. Rothberg
Assistant Examiner—David J. Zobkiw
Attorney—Craig, Antonelli & Hill

[57] ABSTRACT

A proportioning device for the admixture of an additive fluid into a fluid medium flowing in a pipe or conduit. The flow rate of the fluid medium is measured and the pump which introduces the additive fluid is controlled in response to the measured flow rate. The measuring system includes a body disposed to be moved linearly against the force of a spring by the fluid medium passing thereby. In one embodiment, this body has a surface which varies along its length and the additive fluid pump has a plunger in contact with this surface. As the body is moved by the varying flow rates of the fluid medium, the effective plunging stroke of the pump is controlled. In another embodiment, a magnetic field is used to detect changes in the position of the body.

38 Claims, 13 Drawing Figures

INVENTORS
HANSJÖRG SCHULER and HARTMUT DOPSLAFF

BY Craig, Antonelli, Stewart & Hill
ATTORNEYS

PROPORTIONING DEVICE, ESPECIALLY FOR WATER TREATMENT SYSTEMS

The present invention relates to a proportioning device for the admixture of an additive fluid to a medium flowing in a piping which is provided with a flowmeter system and a proportioning pump discharging into said piping with the pump delivery being controlled in dependence of the throughput measured by the flowmeter system.

Such devices are particularly used for the admixture of an additive fluid to drinking and industrial water, to prevent the formation of scale and the development of corrosion damage in the piping as well as in boilers and the like, or to effect degermination.

A known device of this type is fitted with a water meter equipped with an electrical contact mechanism. After a certain amount of water has passed through, the water meter transmits a signal which is converted into a steady state delivery pulse. During this pulse the proportioning pump is operative. That means, a certain, given quantity of additive fluid per signal is admixed to the water. The disadvantage of this device consists in that a specially sophisticated and expensive metering mechanism is required which, moreover, is susceptible to troubles as the free rotation of the rotary element may be impaired by deposits, which will reduce responsivity so that, at low flow rates, possibly the metering mechanism will fail to respond and no injection will take place at all. At higher flow rates, a sluggish metering mechanism will cause insufficient proportioning. Moreover, the disadvantage of such metering mechanisms is that the pressure drop, caused by the metering mechanism at maximum flow rate, is very high and could be as much as 1 atm. A very essential disadvantage of such proportioning devices is the so-called "clotting" at low flow rates. With 1 inch pipes, usually employed in house piping, the volume of the medium to be injected in the pipe is approximately half a liter per running meter of piping. If the flowmeter transmits a pulse after every 2 liters, which can be considered a very favorable value, one proportion of additive fluid is admixed after the passage of every fourth meter of liquid column related to the medium flowing in the piping. The medium, which in this moment, is in the vicinity of the injection point, is excessively proportioned, whereas the medium more distant from the injection point is not sufficiently proportioned and/or not proportioned at all. At low flow rates, that is, when small quantities are tapped, which mainly applies to households and especially to water tapped for cooking and drinking, the "clot" of excessively proportioned water mixes only poorly with the following and/or preceding column of insufficiently proportioned water. Excessive proportioning, however, may be injurious to health and/or an undesirable corrosive effect and must therefore be avoided by all means. This, however, cannot be satisfactorily ensured with the known proportioning devices.

The objective of the present invention is to offset these disadvantages and to obtain an improved proportioning device. According to the present invention this objective is achieved by arranging a spring-loaded slidable body in the piping in flow direction whose position depends on the throughput, and by controlling the delivery of the proportioning pump in dependence of the position of said body only.

The present invention has the advantage that no impellers or turbines, that is, no rotary components, which are particularly susceptible to deposits, are used for throughput metering, but that a rugged flow body is provided, which is not only less susceptible to troubles but can also be manufactured at considerably lower costs. Another advantage is that it is not delivery per pulse which is constant but that delivery is controlled in dependence of the flow rate. This allows to avoid "clotting," that is, excessive local proportioning, which is particularly harmful and undesirable in households because, at low throughput, a higher injection frequency can be achieved than with the known devices. The injection frequency, that is, the number of injections per meter of liquid column in the pipe is constant with the known devices and cannot be raised above a certain level, not even by improving designs, as, at a high throughput, that is, a high flow rate, a maximum number of strokes per unit time cannot be exceeded. In the proportioning device according to the present invention, however, the quantity delivered per stroke is varied, permitting to obtain smaller intervals between successive "injection clouds" in the flowing liquid column at a low throughput, at which the risk of excessive local proportioning is particularly great due to insufficient mixing. While the intervals of successive "injection clouds" in the flowing liquid column are constant with the known devices because a constant delivery per stroke at a constant proportioning ratio of additive fluid to fluid carrier medium is applied, in the devices according to the present invention, at lower flow rates, that is, at an even poorer mixing quality, and in spite of a constant proportioning ratio, the individual "injection clouds" succeed each other more closely than at a high throughput with better mixing quality. This is accomplished by variation of the quantity of additive fluid admixed per injection procedure.

The proportioning device according to the present invention may be equipped with any type of pump. For example, use can be made of a gearpump whose gears are turned by a certain angle during each injection procedure, thus delivering a quantity proportional to the turning angle. Likewise, a swash-plate pump can be used whose swash-plate angles are controlled in dependence of the body position. A particularly preferred embodiment of the present invention is provided with a diaphragm or plunger pump serving as proportioning pump whose stroke is dependent on the stroke of the flowmeter body. Diaphragm and plunger pumps are especially suitable for delivering small quantities and very small quantities and can be easily adjusted to different deliveries by changing the pump stroke.

In one embodiment of the present invention the body is slidably arranged in a guide in flow direction and an element sensing the position of said body is slidably disposed perpendicularly to the moving direction of the body. Sensing is mainly intermittent, this offering the advantage of practically no retroaction of the sensing procedure to the position taken by the body depending on throughput.

In one preferred embodiment of the present invention, the body features a face which is oblique with respect to the direction of motion of said body and cooperates with the sensing element. In this embodiment the face obliquely arranged with respect to direction of motion of the body may be designed as a conical face. Furthermore, it may have steps and/or form a curved face, the distance of the curved face from the axis of the body describing a certain curve. A correspondingly shaped face not only permits to distribute the additive fluid proportionally, that is, with a constant proportioning ratio of fluid carrier medium to additive fluid, but also to vary this proportioning ratio in the desired dependence. For example it may be desirable to increase the proportion, that is, the admixed proportion of additive fluid, at a low throughput and to decrease it at a high throughput. By selection of a correspondingly curved face, proportional admixture can be obtained, even in case of a non-linear relationship between the distance of motion of the body and the throughput. In the same way, the shape of said face effects that the proportioning pump delivers no additive fluid at zero throughput, thus preventing undesirable excessive proportioning, the so-called standstill proportioning, of the fluid carrier medium remaining at the injection point. According to the Federal Health Office (Bundesgesundheitsamt) and the "DVGW," this is of vital importance for injection techniques for drinking and industrial water treatment.

In a particularly preferred embodiment of the present invention, the face obliquely arranged with respect to the motion direction of the body forms the stop face for limiting the stroke of the proportioning pump. Thus, a very lasting and safe proportion setting may easily be obtained, which, at the same time, can be accomplished with conceivably little expenditure.

In one embodiment of the present invention, the sensing element is formed by the extension of the stroke plunger of the proportioning pump. By this arrangement, all additional bearings, joints and guides for a sensing element are not required, as the guide, which is needed anyhow for the pump plunger, is also used for this purpose.

The pump cylinder, into which the additive fluid is sucked and from which it is pumped into the carrier medium flowing through a proportioning chamber with a flowmeter body, may be connected alternately to the additive fluid reservoir or proportioning chamber and disconnected again by means of valves and slides. In this arrangement, the valves, for example, may be designed as pressure-controlled check valves or as force-controlled valves or slides. The disadvantage of all these designs, however, consists in that a relatively high engineering and constructional expenditure is required. Moreover, such valves and controls require relatively much space. However, very little space, with great dependability and very low expenditure, is required for a particularly preferred embodiment of the present invention, in which a pump cylinder is arranged in the wall of the proportioning chamber housing the body. The front side of said pump cylinder facing the proportioning chamber is provided with a lip seal which, in a self-sealing manner, encloses a sensing pin formed by an extension of the pump plunger. The funnel-shaped lip seal, made of elastic material, has a disc-shaped lip at its larger diameter. This embodiment of the present invention is characterized in that connection channels from the stroke chamber in the pump cylinder to the additive fluid reservoir are provided whose openings into the stroke chamber of the pump cylinder are located in the vicinity of the plunger front side when the plunger is at the reversal point which is more distant from the flowmeter body. Hence, with this embodiment of the present invention, opening and closing of the connection channels from the stroke chamber to the additive fluid reservoir is effected by the plunger itself. Opening and closing of the connection channel from the stroke chamber to the proportioning chamber is achieved by a lip seal which opens only in case of overpressure in the stroke chamber, whereas said lip seal, due to its inherent elasticity, closes in case of pressure balance in the proportioning chamber. In case of overpressure in the proportioning chamber, the lip of the lip seal, owing to said overpressure, is additionally pressed against the sensing pin, thereby achieving an increasingly tighter press sealing as the overpressure increases. This embodiment according to the present invention is maintenance-free and has a long service life.

The pump may be designed for a constant stroke speed. In one embodiment of the present invention, however, the stroke speed of the proportioning pump is adjustable, thus permitting an appropriate adjustment of the proportioning ratio to the respective requirements of the system, even after installing the proportioning device. The stroke frequency in this case is preferably constant.

In one embodiment of the present invention, however, the stroke speed of the proportioning pump is controlled in dependence of a characteristic of the carrier medium flowing through the piping. In this arrangement, the pH value may be used as controlling characteristic. If drinking water is the carrier medium, the chlorine or fluorine contents may serve as characteristics. Controlling of the admixed quantity of additive fluid by means of the throughput on the one hand and by means of a second characteristic on the other hand, allows, for the first time ever, to achieve not only an exact proportional admixture but also a terminal value proportioning. Thus, for example, the chlorine content of water is measured and consequently the stroke speed of the pump is set to such a value as to bring the desired chlorine content to a constant terminal values, irrespective of the chlorine content of the incoming water. This is of particular importance for the chlorination of drinking and industrial water as, depending on the lengths of time and piping, the chlorination effected in the waterworks decreases. In fact, the water is mixed with a constant chlorine proportion in the waterworks, yet, in case of frequent tapping, this chlorine proportion is only maintained in the immediate vicinity of the waterworks, since the chlorine content is reduced owing to chemical reactions depending on the time during which water remains in the piping system. Consequently, at tapping points very distant from the waterworks, the chlorine content may possibly fall considerably below the desired chlorine content. In such cases, or if an unusually high chlorine content is required at one tapping point, the device according to the present invention may be utilized advantageously. For this purpose, the chlorine content or, in other cases, another characteristic to be set to a constant terminal value, is measured and, depending on the difference between measured value and required nominal value, the stroke speed of the proportioning device is varied. Such a method of operation with a constant proportioning terminal value cannot be applied with proportioning devices known so far.

The proportioning pump can be driven by different methods. In one embodiment of the present invention, a lifting magnet is utilized as a drive. In this arrangement, the lifting magnet may be controlled by an automatic circuit breaker, installed in the circuit of said lifting magnet, or by a pulse generator. An automatic circuit breaker is used in the circuit if only the proportioning device is to be adjustable. If, however, it is desirable that the proportioning device is to change its stroke speed in dependence of a characteristic, it is expedient to provide a pulse generator whose output frequency is depending on the difference between the nominal value and the actual value of the characteristic.

Another embodiment of the present invention is characterized in that the pump is driven by a gearmotor. In this arrangement, the driving speed is variable, which is accomplished by controlling the motor speed or by utilizing a step-variable or infinitely variable speed gear.

Conventional drive means require an electrical connection. In some cases, however, an electrical connection is not available and can only be established with great expenditure or not at all. To ensure even in such cases advantageous application of the proportioning device according to the present invention, in one embodiment of the present invention the proportioning pump is provided with a hydraulic drive. In this arrangement, the hydraulic drive may be fed by tapping the medium flowing in the piping.

The waterworks require that, under no circumstances, water in house pipings should return into the public piping system in case of reverse pressure gradients. Up to now, special return flow stopping devices have been installed to meet this requirement. In one preferred embodiment of the present invention the spring-loaded body, slidably arranged in flow direction, is designed as a check valve. In this way, the above-mentioned requirement of the waterworks can be met without additional expenditure which would involve a higher price for the system. Furthermore, in this arrangement, additional pressure drop, which would inevitably result from the return flow stopping device to be installed separately, is eliminated; there is only a pressure gradient across the proportioning device, roughly corresponding to the total pressure gradient across a return flow stopping device. In this connection, it should be taken into account that this pressure gradient already includes the pressure gradient across the metering mechanism. As compared to the known proportioning devices employing a metering mechanism with a rotary type metering member and requiring an additional return flow stopping device, this arrangement reduces the total pressure gradient to approximately 1/7.

In the described embodiments of the present invention, the position of the body is sensed mechanically. Yet, it is also possible, to utilize any other method for determining the position of the body. The position of the body can, for example, be determined by means of inductive or capacitive distance meters. In a preferred embodiment of the present invention, however, the body, in a manner known in principle, influences a magnetic field acting on fixed, magnetic operated contacts, and, furthermore, a variable magnetic field is provided which, in the vicinity of the contacts, is superimposed on the magnetic field influenced by the body. Magnetic operated contacts of this type, for example, are known as "Reed" contacts. The reeds are sealed in a glass tube filled with inert gas, the contact being closed by means of a magnetic field acting on the reeds. The magnetic field strength, at which the contact opens or closes is given and only depends on the design and manufacturing tolerances of the contact used. The magnetic field, acting on the contact, is influenced by the body, that is, intensified or weakened, and the magnetic field strength at the contacts is closely related to the position of the body. Now, to permit determination of the position of the body from outside, a variable magnetic field has been provided whose field strength is varied until the contact changes over to its alternate position. As the contact always requires the same field strength for change-over, while the actually available field strength represents the sum or difference between the field strength of the variable magnetic field and the magnetic field influenced by the body, the respective position of the body can be determined. For any possible position of the body a constant value of the variable magnetic field is assigned so that the determination of the variable magnetic field allows to measure the position of the body and, thereby, the flow rate. For example, influencing the magnetic field at the location of the magnetic operated contacts by means of the body can be accomplished by disposing a stationary permanent magnet, in the field of which the ferromagnetic body is located, whereby the field distribution is changed as the body is displaced. Practically, the body constitutes a variable shunt for the field zone in which the magnetic operated contacts are located. In a preferred embodiment of the present invention, however, the body is provided with a permanent magnet whose magnetic field strength in the zone of the magnetic operated contacts is depending on the position of the body. Depending on whether, with changing flow rate, the body moves away from or approaches the magnetic operated contacts, the magnetic field strength varies accordingly in the zone of the magnetic operated contacts. By suitably arranging the relative position of the magnetic operated contact(s) with respect to the permanent magnet of the body, it is possible to obtain an unequivocal relationship between the field strength at the location of the magnetic operated contacts and the position of the body and, thereby, the flow rate.

The variable magnetic field may also be produced with the aid of a permanent magnet, which, for example, may be adjustable or swivelling in its distance to the magnetic operated contacts or which is provided with a magnetic shunt whose adjustment permits to vary the field strength at the location of the magnetic operated contacts. This adjustment mechanism may be provided with a scale directly calibrated to flow quantities. The change-over of the magnetic operated contact serves as an indicator that the reading on this scale corresponds to the flow rate. For the first calibration the flow rate must, of course, be determined by means of another measuring gauge. In a particularly preferred embodiment of the present invention, the variable magnetic field is not generated by means of a permanent magnet but by a coil. Such a coil, which, for example, can be wound directly around the magnetic operated contacts, in a particularly simple manner allows to vary the magnetic field by varying the coil current. The particular advantage of this arrangement is that the magnetic field adjustment can be remotely controlled.

In one embodiment of the present invention, the two magnetic fields in the zone of the magnetic operated contacts are counter-directional and, in the absence of the variable magnetic field, the contact is always closed, irrespective of the position of the body within the flow measuring range. Thus, in the absence of the variable magnetic field, the magnetic field strength at the location of the magnetic operated contacts always exceeds the values required for opening the contacts. By connecting the variable magnetic field, the magnetic field at the location of the magnetic operated contacts is now weakened until the contact(s) open(s). Then the strength of the variable magnetic field is directly related to the position of the body which can thereby be determined. In this arrangement, the device can be designed so that, for example, the contacts open when the body is in its idle position, blocking, for example, the cross section of flow and thus simultaneously permitting to determine if a flow exists at all, even if, for example, it may be present downstream of the flow measuring zone.

Yet, it is also possible and provided in another embodiment of the present invention that the two magnetic fields are unidirectional in the zone of the magnetic operated contacts and that the contact, in the absence of the variable magnetic field, is always open, irrespective of the position of the body within the flow measuring zone. This means, that in this case, at the location of the magnetic operated contacts, the maximum value of the magnetic field influenced by the body is still below the value required for switching the contacts. Actually, the value for this magnetic field at the location of the contacts varies in dependence of the position of the body, yet it is always below the switching value. The switching value is obtained only by the superimposition of the unidirectional, variable magnetic field. In this case, too, the value of the variable magnetic field can be unequivocally related to the position of the body and, thereby, to the flow rate. The particular advantage of all these embodiments of the present invention mainly consists in that the flow rate can be determined also from greater distances without involving additional expenditure. For this reason these devices are especially suitable for telemetering. In this way, these devices with the magnetic field influenced by the body and with the variable magnetic field, can basically be utilized as flowmeters as well, independently of the proportioning device.

To avoid manual adjustment, that is, to permit the device to automatically adjust the variable magnetic field until change-over of the magnetic operated contacts, one embodiment of the present invention, in which the two magnetic fields in the zone of the magnetic operated contacts are counter-directional, is designed so that the intensity of the current flowing through the coil is influenced by a control unit which increases the current intensity when the contact is closed and decreases the current intensity when the contact is opened. In the same way, a device, in which the two magnetic fields in in the zone of the magnetic operated contacts are unidirectional, can be provided with a control unit that influences the intensity of the current flowing through the coil in such a manner that the current intensity is reduced when the contact is closed and increased when the contact is opened. Setting of the coil current is consequently effected by a type of two-point regulator; in this arrangement the current varies between a too high and a too low value, the mean value of the current being a measure for the position of the body and, thus, for the flow rate. The current variations can be very easily produced at a relatively high frequency so that a commonly used ammeter with a pointer-type instrument can be utilized as indicator without the pointer jittering to a noticeable or disturbing extent. In this arrangement, the magnetic operated contact(s) may connect a series resistor in the coil circuit or bridge the latter and, thereby, effect a two-point regulation of the Tirill regulator type. Thus, with as little expenditure as might be conceived, the variable magnetic field is automatically adjusted to a value which is a measure for the position of the body and, thus, for the flow rate. In its simplest version, the control unit therefore only contains a coil with a series-connected resistor which is connected in parallel to a magnetic operated contact. The closing-to-opening time ratio of the parallel-connected contact defines the mean value of the current flow and is a measure for the field strength of the variable magnetic field. In this case the frequency of switching cycles of the parallel-connected contact may vary. The frequency, which should be only so high as to ensure an indication free from fluctuation or jitter, does not matter in this arrangement either. There is, however, also another method to determine the switching point of the magnetic operated contact in dependence of the field strength of the variable magnetic field and, thereby, the flow rate. With one embodiment of the present invention, the intensity of the current passing through the coil increases and decreases periodically. Now, if, for example, a synchronized oscillograph or a synchronized stroboscope is used to mark the value at which the magnetically operated contact changes over, with the current increasing or decreasing, a scale reading is obtained, which may be directly graduated in units of flow rate. In this case, the current curve may, for example, be sinusoidal. It should be pointed out that the current applied is not an alternating but a sinusoidal pulsating direct current, that is, the current intensity does not pass through zero. The disadvantage of such a curve, however, is that the maximum and minimum values run along a horizontal tangent in the range of which measurements would necessarily become very inaccurate with the result that only the steeper sections of the sinusoidal curve could be used for measuring. With a preferred embodiment of the present invention, the coil current intensity increases and decreases at constant time intervals. Thus the curvature of the current is practically triangular, the current increasing and decreasing linearly at constant speed. That is to say, the curvature is symmetrical to the maximum and minimum values of the current. The advantage of such a curvature is that the maximum and minimum values can be located to the end points of the measuring range, so that, practically, the measuring range comprises the entire current fluctuation range. Yet, it is also possible, and has been provided for one embodiment of the present invention, to keep the increase and decrease rates of the coil current constant but different from each other. For example, the coil current may show a saw-tooth curvature with a very steep edge. For measuring only the edge that is less steep is used. Using one edge only while making the other edge very steep, has the advantage that the recurrence frequency of this less steep edge can be chosen higher than for the curvature with a less steep edge. At any rate, it is not expedient to use both edges as the magnetic operated contact shows a certain hysteresis, that is, it does not close and open at the same current intensity. The result of this is that for the one edge the magnetic operated contact changes over at a value different from that for the other edge. It is therefore expedient to use one edge only to eliminate hysteresis of the magnetic operated contact. Allowance can be made for the actual switching value right from the start by calibration and corresponding graduation.

Instead of using the current intensity during change-over of the magnetic operated contact as a measure for the flow rate, as has been described above, in one embodiment of the present invention the ratio of the closing time of the magnetic operated contact to the periodic time of the coil current is used as a measure for the flow rate. In many cases it is easier to convert the ratio of these two times into a current suitable for indication or into a corresponding voltage than to convert the current during change-over of the magnetic operated contact. In this case it is not imperative either that the frequency of the coil current or its cycle duration be constant, even though this may be suitable in many cases.

In the above-mentioned embodiments of the present invention, the cycle of the coil current is independent of the switching point of the magnetic operated contact. Only that point on the current curve changes at which the magnetic operated contact changes over. With preferred embodiments of the present invention, however, the direction of the coil current changes when the contact changes over. This means, that, for example, with a saw-tooth characteristic of the coil current, the current intensity drops to its initial value when the contact changes over whereupon a new cycle begins at said initial value. In the case of these embodiments of the present invention, the frequency or cycle duration of the coil current depends on the change-over of the magnetic operated contact and thus on the position of the body. These embodiments of the present invention also permit indication of the terminal value which the current has reached when the contact changes over and thus indication of the flow through the device. With preferred embodiments of the present invention, however, the frequency of the switching cycles of the magnetic operated contact is taken as a measure for the flow rate. The variable frequency as a measure for the flow rate is obtained by allowing the current to start always at the same initial value and permitting it to drop to the initial value when the magnetic operated contact changes over. The flow may be indicated, for example, by a commonly used frequency meter, such as a reed-type frequency meter. Preferred embodiments of the present invention, however, are provided with a circuitry which, with each switching cycle, delivers a constant electrical charge to an integrating element connected to an indicator. In this arrangement, the integrating element serves as filter element to smooth and convert the initial value into a "quiescent" quantity which is taken as a measure of the flow through the device. Integrating element and indicator, for example, form one instrument of the moving coil indicator type. In this arrangement, the measuring system of the moving coil instrument, which has mechanical and electrical inertia, is employed as integrating element.

Irrespective of how the measured value corresponding to the flow rate has been obtained, it is a suitable means to influence the delivery of the proportioning pump. If the flow is transduced into a current, this current may influence the delivery of the proportioning pump, as, for the example, the stroke of a diaphragm or plunger pump. If the flow through the device is shown as the ratio of closing time to cycle time of the magnetic operated contact, this time relationship can also be used to control the stroke of a diaphragm or plunger pump. If the flow is shown as a frequency, it is also possible to control the delivery of the proportioning pump in dependence of said frequency. For example, the proportioning pump can deliver a certain quantity per cycle or after a certain number of cycles. At a high frequency the delivery is higher than at a low frequency, that is, the delivery depends on the position of the body and thus on the flow rate.

In preferred embodiments of the present invention, the body, in its direction of motion, is guided on a cylindrical mandrel arranged coaxially to the flowmeter chamber, said mandrel plunging into a concentric blind hole in the body. In one embodiment, the blind hole is provided with a tension spring which is supported at the bottom of the hole and at the mandrel front side. This tension spring exerts a force on the body trying to move said body against the direction of flow of the medium. As long as the body does not move and rests between its two end positions, the spring force is equal to the force exerted on the body by the flow of the medium. For each flow rate there is a different point at which the two forces are in balance. By properly choosing the flowmeter chamber and body cross sections as well as the tension spring, it is possible to obtain any relationship between the position of the body and the flow rate. It is, for example, possible to achieve a linear or square root relationship between the position of the body and the corresponding flow rate.

The magnetic operated contact can be positioned outside the flowmeter chamber. In this arrangement, the wall of the flowmeter chamber consists of non-ferromagnetic material. The disadvantage of this consists in that the housing of this device must not consist of cast iron or cast steel, as otherwise the housing would have a shielding effect on the body. In one preferred embodiment of the present invention the mandrel is therefore provided on one side with a longitudinal bore to take up the magnetic operated contact. The advantage of this arrangement is that the distance between body and contact can be kept relatively small, that is, that, for example, the permanent magnet attached to the body may be relatively small and weak.

In an improved embodiment of the present invention, the longitudinal bore of the mandrel also contains the coil generating the variable magnetic field, said coil being, for example, wound directly around the contact. In this way, a very compact arrangement is obtained, which therefore can also be used for devices for measuring relatively small flow volumes.

In one embodiment of the present invention the permanent magnet is designed as annular magnet which may be axially or radially magnetized. This annular magnet, with an inside diameter larger than the outside diameter of the mandrel, generates a magnetic field with a field strength characteristic which is favorable to the purposes of the present invention. By this arrangement according to the present invention the risk of false measuring, owing to measuring instruments being influenced by external magnetic fields, is relatively small, since, on the one hand, the housing of the device may be designed as shielding and, on the other hand, the magnetic field strength at the magnetic operated contacts may be chosen relatively high so that external fields of low intensity cannot cause serious interference. Nevertheless, both the annular magnet and the coil may be of relatively small size, as they produce a sufficiently strong field owing to their close vicinity to the contacts in this zone.

The longitudinal axis of the mandrel, for example, may be located parallel to the flow direction of the medium. In this case, the mandrel is connected to the housing via a web or several radially arranged webs. Difficulties in assembling, however, may arise from the fact that the mandrel contains the coil and contacts and that its connections must lead to the outside through a hole in the web, for example. In a preferred embodiment of the present invention, the longitudinal axis of the mandrel therefore is obliquely arranged to the inlet and/or outlet direction of the flowing medium. The advantage of this arrangement is that the end of the mandrel most distant from the body may lead out of the piping so that the mandrel can be easily installed and the magnetic operated contact and the coil remain accessible from the outside and, in particular, sealing of the electrical connections is not required.

In a preferred embodiment of the present invention, the magnetic operated contact is slidably arranged in the motion direction of the body. As a result of this, the relation between position of body and field strength of the magnetic field influenced by the body can be changed by shifting the magnetic operated contact. In other words, in this way, calibration of the flowmeter is relatively easy. Thus, for example, at a certain flow rate the reading can be adjusted to the said flow rate. Instead of using a slidable magnetic operated contact, it is also possible to apply an additional direct current to the coil, that is, to shift the maximum and/or minimum value of the fluctuating direct current. Yet, it is also possible to provide an additional coil which is fed by a variable but otherwise constant direct current.

In one embodiment of the present invention, the longitudinal bore of the mandrel is provided with a very temperature-responsive resistor which, in a manner known as such, serves for the compensation of the temperature response of the arrangement and/or for the determination of the temperature of the flowing medium. Preferably, NTC or PTC resistors are used as very temperature-responsive resistors. A resistor of this type, for example, may influence the current flowing through the additional coil. Yet, this resistor may also influence the pulsating direct current. Finally, the resistor may also be utilized for the determination of the temperature of the flowing medium in the known manner. As this resistor is located in a zone, which is largely beyond the range of influence of external temperatures, the temperature of the flowing medium can be determined with relative accuracy.

In the zone of the magnetic operated contacts, one preferred embodiment of the present invention is provided with at least one flux deflector guiding the magnetic flux to the reeds. Depending on the size of the annular magnet and the path length along which the flowmeter body can travel, it may be that, with a zero or constant coil current, at first the contacts change over while the flowmeter body is displaced and then switch back again while the flowmeter body is further displaced in the same direction. To eliminate this ambiguity, a flux deflector is provided, which, for example, is designed as a tube of ferromagnetic material enclosing a certain zone of reeds. This deflector permits to obtain an unequivocal relationship between the coil current and the position of the flowmeter body at each switching point.

Figure 4B:
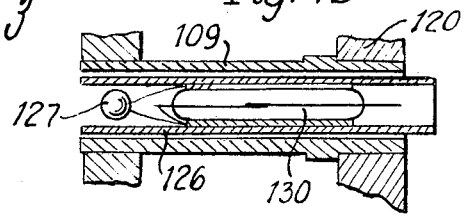
Figure 4:
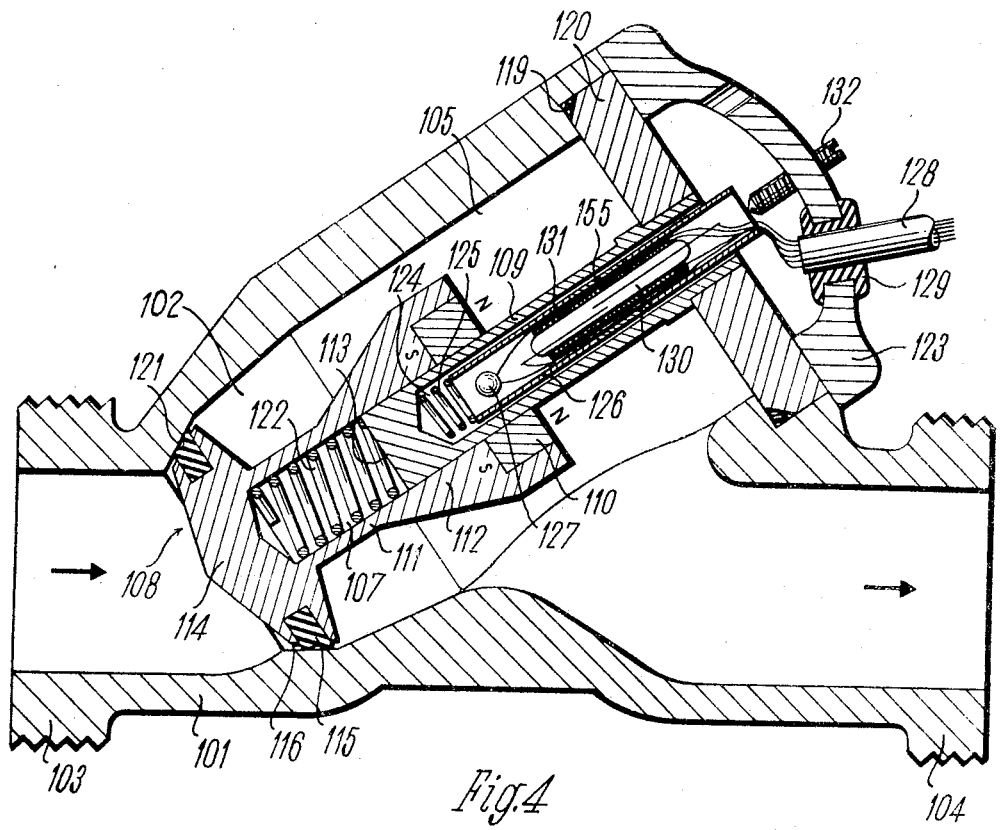
Figure 5:
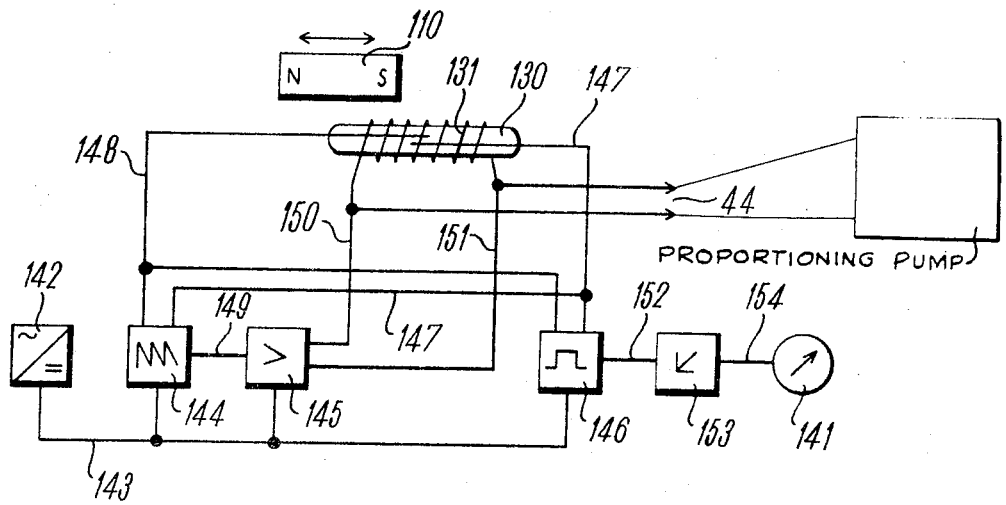

Generally, the additive fluid quantity per unit volume of the carrier medium flowing through the piping, which is admixed by the proportioning pump, is varied by changing the stroke of the proportioning pump. In this way, however, a variation ratio of approximately more than 1 : 10 can hardly be obtained with a justifiable technical expenditure, provided that the injection quantity, that is, the proportion of additive fluid admixed per unit volume of flowing medium remains constant. Indeed, it is also known to design the proportioning pump with constant delivery per working cycle and to relate the number of working cycles to the flow rate. Yet, the disadvantage of this arrangement is that, in case of small flow volumes, the interval between the individual working cycles becomes very long and that the individual "injection clouds" in the medium flowing through the piping show a large distance from each other while, at the same time, the local concentration may be accordingly high so that there is no steady proportioning. For this reason, one preferred embodiment of the present invention is characterized in that both the quantity delivered by the proportioning pump per working cycle and the number of working cycles of the proportioning pump per unit time depend on the position of the flowmeter body. This allows to obtain a very large variation range of the flow at a constant admixture per unit volume of the flowing medium. It is, for example, possible to maintain a given ratio, admixed additive fluid to fluid carrier medium, within a flowing range of 1 : 50. In this case, the stroke or the quantity delivered per stroke respectively, remains preferably set to a fixed minimum value in the lower flow range, which amounts, for example, in the zone of minimum flow up to three to four times the minimum flow. In this range only the number of strokes per unit time is varied. If the flow continues to increase, mainly the stroke, that is, the delivery per working cycle is varied, whereas the number of strokes, that is, the number of working cycles per unit time varies Details and embodiments of the present invention are given in the following description in which the present invention is described in detail and illustrated by means of the examples of embodiments shown in the drawings. In the accompanying drawings FIG. 1 is a section through the plane of the piping axis showing a proportioning device according to the present invention with magnetic drive and additive fluid reservoir arranged above the pump cylinder, FIG. 1A is a schematic block diagram showing an embodiment of the present invention similar to the FIG. 1 embodiment except for utilizing the fluid medium to drive a diaphragm-type pump, FIG. 2 is a section perpendicular to the plane of the piping axis through another embodiment of the present invention, having an additive fluid reservoir beneath the pump cylinder, FIG. 3 is a section taken along the line III—III in FIG. 2, FIG. 3A is a partial sectional view of a modified curved surface body which can be utilized with the present invention, FIG. 4 is a longitudinal section through a flowmeter with a magnetic measuring device, FIG. 4A is a partial sectional view of a modified body similar to the body in FIG. 4 except for the substitution of magnets for the spring biasing the mandrel, FIG. 4B is a partial sectional view of a modified arrangement similar to FIG. 4 except that the contacts 130 are closed, FIG. 5 is a block diagram illustrating the measuring procedure, and FIGS. 6 to 9 are various diagrams showing the time versus coil current intensity ratio as well as opening versus closing times of the magnetic operated contacts.

A tubular basic body 1, provided with a circular plate which is tangentially arranged with respect to the piping, is preferably designed as a casting and, by means of connection threads 3 or 4 respectively, is installed with its tubular adapter(s) 2 in a piping not shown herein. Said basic body, which is widened as against the piping, forms a housing to incorporate a flowmeter system. Downstream of the housing, the cross section of adapter 2, which is bolted to basic body 1 and sealed by means of an O-ring seal, decreases to approximately the cross section of the piping, with three webs 6, evenly spaced over the inside perimeter at the end facing basic body 1 and radially arranged to the longitudinal axis of adapter 2, forming a bearing in the center for shaft 7 of flowmeter body 8. Basic body 1 is characterized in that it has a proportioning chamber 9, the cross section of which increases downstream of connection 3 to show a cylindrical shape further downstream. In its conical section the proportioning chamber 9 is provided with a plurality of guide ribs 10 which are arranged in flow direction equidistant to the longitudinal axis of proportioning chamber 9 and form a guide for flowmeter body 8. Adjoining to the cylindrical shaft 7, the flowmeter body 8 has a cylindrical section 11 whose diameter is larger in comparison to that of shaft 7. Attached to that said cylindrical section 11, against the direction of flow, there is a tapered cone section 12 leading up to a cylindrical section 13 of a diameter approximately corresponding to that of shaft 7. Adjacent to the cylindrical section 13 there is a valve disc 14 which in its center section shows a conical face 16 provided with an O-ring seal 15. The conical face 16 leads up to a cone 17 which points upstream and has a maximum diameter approximately corresponding to the pipe diameter. Viewed in the direction of flow, connection thread 3 is followed by a short cylindrical face 18 of basic body 1 with a bore 19 closed by a plug 20. Bore 19 is required for the functioning of the return flow stopping device and can also be used as a pressure gauge connection. To check the return flow stopping device, a valve in the piping leading to the proportioning device is closed and bore 19 is opened. With the return flow stopping device functioning properly, no fluid flows back from the proportioning chamber. Adjacent to the cylindrical face 18, there is a conical face 21 with the same taper ratio and length as conical face 16 of valve disc 14 and to which, at zero flow, the O-ring seal fits tightly due to the action of a helical tension spring 22 surrounding shaft 7 and bearing against the webs 6 and the annular front side of cylindrical section 11 which is adjacent to shaft 7. The conical face 21 is adjoined by a conical face 23, which is interrupted by guide ribs 10 in the peripheral direction and leads up to a cylindrical face 24. The cylindrical face 24 is provided with a bore 26 closed by a plug 25. Bore 26 may be used as pressure gauge connection in the same way as bore 19 and, in addition, it can be used for draining the device. In adapter 2 the cross section of cylindrical face 24 is gradually narrowed to the diameter of the adjoining piping.

Figures 1A, 2:
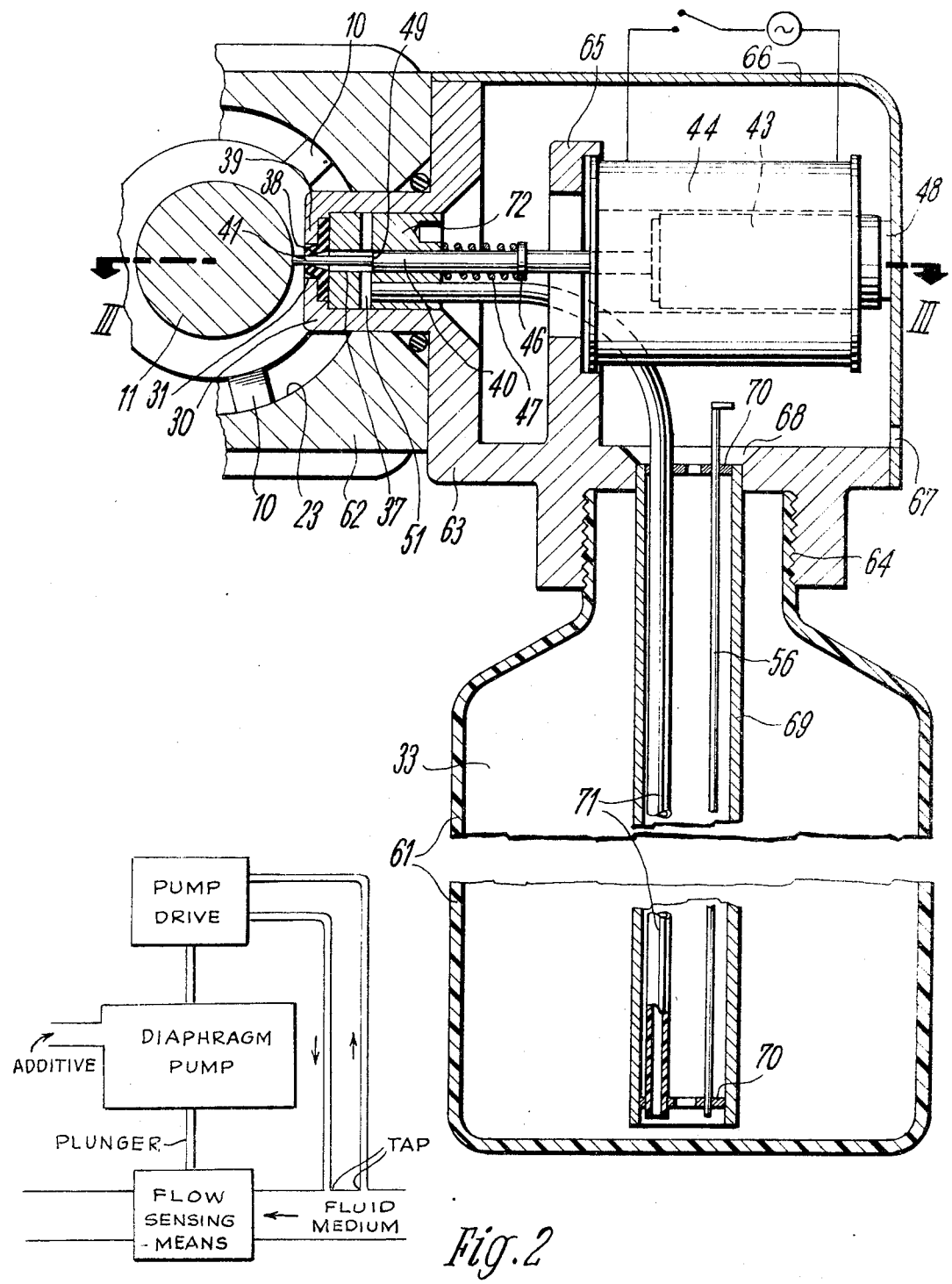
Figure 3:
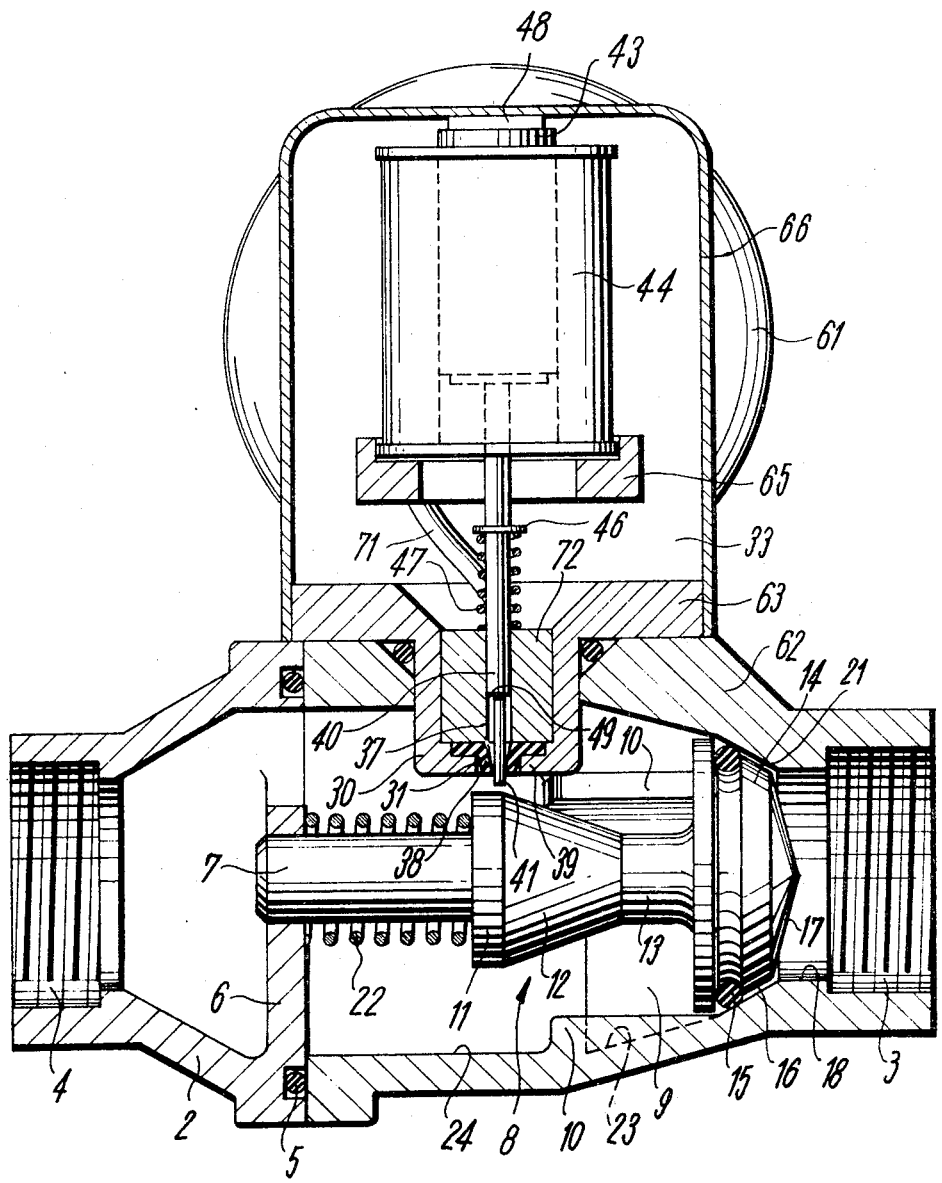
Figure 3A:
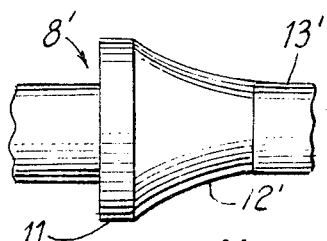
Figure 4A:
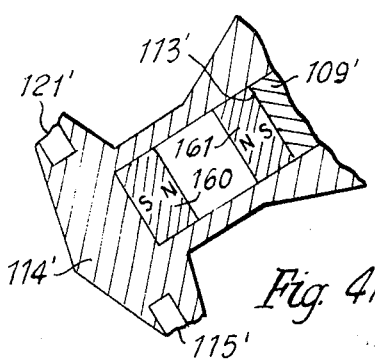

FIG. 3A shows a modified body 8' which can be used in the embodiments of FIGS. 1–3 in place of the body 8. This body 8' has a curved face 12' in place of the tapered cone face or section 12 of the FIG. 3 embodiment. With this curved face, it is possible to vary the length of the stroke of the pump plunger in a non-linear manner with respect to the linear movement of body 8'.

In the area of cylindrical face 24, the wall of proportioning chamber 9 is provided with a cylindrical boss 30 which is radially arranged to the flow axis. The center line of said cylindrical boss 30 is radially directed to the longitudinal axis of the flowmeter body 8 and, at zero flow, said center line meets the the cylindrical section 11 near the point of transition to conical section 12. The boss 30 has an axial bore. Bore 31 opens into the proportioning chamber 9 and widens to a threaded bore 32 in a direction opposite to proportioning chamber 9. This widened bore opens into an additive fluid reservoir 33 which is formed by a hollow cylinder 34 and closed at the top by a cover 35. The hollow cylinder 34 is held in the tangentially arranged circular plate of basic body 1 and in cover 35 in one ring groove respectively and sealed by means of an embedded seal ring. Cover 35 is tightened to basic body 1 by means of screw bolts not represented herein.

A pump cylinder 36 with an axial pump through-bore 37, disposed coaxially with respect to bore 31, is screwed into the threaded bore 32. At its front end facing the proportioning chamber 9, said pump cylinder 36 presses a funnel-shaped, elastic lip seal 38 from inside against a forward end wall 39 of cylindrical boss 30. In pump bore 37, forming the side wall of the stroke chamber, a pump plunger slides up and down, said plunger which, at its front end facing the proportioning chamber 9, is provided with a central sensing pin 41 and extends to the opposite side and leads through a center bore in cover 35 where said plunger is sealed by means of an O-ring seal 42. At the end of plunger 40 projecting through cover 35, a magnetic core 43 is attached which forms the moving armature in the working air-gap of a magnetic coil 44. The magnetic coil 44 is enclosed by a protective cap 45 secured to cover 35. A disc 46 is attached to the plunger 40 inside the hollow cylinder 34, in the area between disc 46 and pump cylinder 36 plunger 40 is surrounded by a helical tension spring 47 which presses plunger 40 upward until the magnetic core 43 rests against a stop 48. In this position, plunger 40 is in its reversal point at maximum distance from flowmeter body 8.

In addition to the central pump bore 37, pump cylinder 36 has feeder channels 50 arranged in parallel to said pump bore 37 and radially arranged cross channels 51 connecting the feeder channels 50 to the pump bore 37. In case plunger 40 is near a reversal point most distant from flowmeter body 8, that is, when the magnetic core 43 rests against the upper stop 48, a connection through said channels 50 or 51 is established between the additive fluid reservoir 33 and pump bore 37.

An overflow tube 52 is provided in cover 35, said overflow tube penetrating the cover and ending in the additive fluid reservoir near the inner cover surface. The outer end of overflow tube 52 is located at the same or at a higher level than the inner end. The overflow tube 52 serves for venting the additive fluid reservoir and as an overflow safety control when filling additive fluid reservoir 33 and, furthermore, as a safety overflow in case of possible leaking of lip seal 38. Furthermore, cover 35 is provided with a threaded through-hole 53 which is closed with a screw plug 54. This opening is used for refilling the additive fluid reservoir 33.

Moreover, cover 35 is provided with an isolator bushing 55 leading from the additive fluid reservoir to the chamber enclosed by protective cap 45. An electrode 56, ending in the lower section of the additive fluid reservoir 33 and being provided with an electric connector 57 at its upper end in the chamber enclosed by protective cap 45, is led through the isolator bushing 55. Electrode 56 is used for signalling if the fluid level drops below the lower end of the electrode. For this purpose, a voltage can be applied between basic body 1 and electrode 56, however, a second electrode which is not represented herein, can also be provided, the voltage being applied to both electrodes.

The magnetic coil 44 is fed with current pulses which are produced by means of a circuit breaker depending on the position of magnetic core 43 or by means of an external pulse generator. If current flows through magnetic coil 44, magnetic core 43 is attracted to the coil center, thus moving plunger 40 in the direction of flowmeter body 8 until sensing pin 41 bears against the flowmeter body 8, stopping the movement of plunger 40. If flowmeter body 8 is in the position shown, in which valve disc 14 stops the flow, sensing pin 41 comes to rest against the cylindrical section 11 before a control edge 49 of plunger 40 has passed and closed the openings of cross channels 51 in pump bore 37. As a result of this, the connection between the stroke chamber, the side walls of which are formed by pump bore 37, and the additive fluid reservoir 33 is maintained. In the pump bore 37 no pressure increase occurs, the lip seal, owing to its inherent elasticity and as a result of the overpressure in proportioning chamber 9, continues to bear against sensing pin 41 and no additive fluid is fed to proportioning chamber 9.

As soon as fluid is tapped from the piping system connected to adapter 2, the pressure in the proportioning chamber 9 drops and the pressure in the supply piping in the zone of the cylindrical face causes valve disc 14 to separate from conical face 21 against the action of helical tension spring 22 and the flowmeter body is moved in the direction of flow. The position the flowmeter body 8 takes in this case is unequivocally related to the flow rate. As soon as a flow occurs and flowmeter body 8 has moved downstream the possible stroke of plunger 40 increases, since the conical section 12, serving as a stop, tapers against the direction of flow. With current flowing through magnetic coil 44, plunger 40 is now moved further downward, its control edge 49 closes the openings of cross channels 51, in the stoke chamber the side walls of which are formed by pump bore 37, pressure builds up, soon exceeding the pressure in proportioning chamber 9, whereupon lip seal 38 separates from sensing pin 41 and the plunger presses out the additive fluid contained in pump bore 37 until sensing pin 41 bears against conical section 12. At the moment when the plunger stops moving in the direction of flowmeter body 8, the lip of lip seal 38, owing to its inherent elasticity, tightly fits to sensing pin 41, separating proportioning chamber 9 from pump bore 37. While the flow is growing, the stroke of plunger 40 increases in accordance with the taper of conical face 12. The shape of this section may also be other than conical, that is, said face may be curved or stepped in the direction of flow. At the moment when the current flow through magnetic coil 44 comes to an end, the helical tension spring 47 pushes plunger 40 back, thus causing underpressure in pump bore 37. The lip seal 38 bearing against sensing pin 41 tightly seals the chamber of pump bore 37 against proportioning chamber 9. As soon as control edge 49 of plunger 40 passes the openings of cross channels 51 on returning, additive fluid is sucked into the stroke chamber from additive fluid reservoir 33.

FIG. 1 also shows a variable pulse generator controlled by a fluid characteristic meter. This fluid characteristic meter measures a characteristic of the fluid medium other than its velocity, such as acidity, and controls the pulse generator such that the number of strokes per unit time of the pump is varied.

FIG. 1A shows, in schematic form, a modified arrangement similar to FIG. 1 except that the portion of the fluid medium is used to drive the pump, rather than the magnetic arrangement of FIG. 1. Also, a diaphragm pump is shown in place of the plunger pump of FIG. 1. In both the embodiments illustrated in FIGS. 1 and 1A, a common plunger extends from the pump drive means through the additive pump and into engagement with the movable body disposed in the fluid medium for controlling the additive pump in response to the position of the body.

Instead of being vertically positioned, plunger 40 may also be disposed horizontally. In this arrangement, additive fluid reservoir 33 may be formed by a cylinder 61 located beneath the plunger as shown in FIG. 2. In this embodiment of the present invention, boss 30 is not an integral component of basic body 1 but a component of a magnet support 63 which is flanged to a basic body 62 corresponding to basic body 1 so that boss 30 projects through a bore in basic body 62 into proportioning chamber 9, the axis of said boss running radially to the axis of flow. A pump cylinder 72 is pressed into the bored boss 30. The magnet support 63 is provided with a threaded connection bore 64 which faces downward and into which cylinder 61 is screwed. In addition, the magnet support 63 is provided with an apertured plate 65 to which magnet coil 44 is secured. Together with magnet support 63 a protective cap 66 encloses the chamber in which magnet coil 44 is located. The lower section of protective cap 66 has a vent hole 67 which also serves as an overflow. Connection bore 64 is stepped and, thus forming the connection bore 68 with a smaller diameter, leads through the magnet support up to the chamber enclosed by protective cap 66. In connection bore 68 a tube 69 is fastened which extends nearly to the bottom of cylinder 61. On both ends tube 69 has one support disc 70 each with several apertures. Through one of these apertures a hose 71 is led, ending on one side near the bottom of cylinder 61 and being secured on the other side in feeder channel 50 of pump cylinder 72. Through this hose the pump sucks in additive fluid from cylinder 61, as soon as there is an underpressure in pump bore 37. Should venting be required on connection or after replacing or refilling cylinder 61, in this embodiment of the present invention, this may be done by providing a hinged stop 48 not shown herein and by manually retracting the plunger so far as to enable sensing pin 41 to separate from lip seal 38, whereby fluid is pressed from proportioning chamber 9 into the stroke chamber and from there through cross channels 51 into hose 71, thus accomplishing venting. By pushing the plunger forward and folding stop 48 back the device becomes ready for operation again.

One of the apertures in the supporting discs 70 is free and serves as a connection between the chamber enclosed by protective cap 66 and magnet support 63 on the one hand and the additive fluid reservoir on the other hand. If, for example, lip seal 38 should not seal off completely owing to fatigue, the medium intruding from proportioning chamber 9 may press the additive fluid through the outside via this free aperture and vent hole 67. Additional apertures in the supporting discs 70 take up the electrodes 56, of which only one is shown. Said electrodes serve for signalling as the level of the additive fluid falls below a given minimum.

With the flowmeter shown in FIG. 4, sensing is not mechanical but magnetical; said flowmeter can therefore be completely separated from the proportioning pump. A tubular basic body 101, preferably designed as a casting and connected to a piping not shown herein via connecting threads 103 and 104 respectively, is provided with a laterally attached hollow cylinder-type section whose axis is inclined with respect to the piping axis, as is also known from stop valves with little flow deflection. The obliquely positioned hollow cylinder forms a measuring chamber in the vicinity of the piping axis. The cross section of said measuring chamber 102 increases in the direction of flow. Measuring chamber 102 is adjoined by a cylindrical chamber 105 into which the piping outlet opens. The piping inlet opens into the other end of measuring chamber 102. At the joint between piping inlet and measuring chamber 102 a conical face 121 is provided. A flowmeter body 108 has a central cylindrical section 111 adjoined in the direction of flow by a truncated cone shoulder 112 carrying on its free end an annular magnet 110 which is axially magnetized with its north pole on the free side and its south pole on the side facing the truncated cone shoulder 112. The flowmeter body may, for example, consist of plastic material or non-ferromagnetic metal, however, it may also consist of ferromagnetic material. In case the latter applies, the truncated cone shoulder 112 overlaps only part of the length of the annular magnet. Against the direction of flow, the cylindrical section 111 is followed by a valve disc 114 its outer surface 116 having the same taper and approximately the same diameter as the conical face 121. The front side of the valve disc 114 facing the flowing medium against the direction of flow, is designed as a truncated cone to achieve an uniform flow through the annular cross section of the inlet. The longitudinal axis of the flowmeter body 108 is identical with the longitudinal axis of the measuring chamber 102 and that of the adjacent cylindrical chamber 105. The flowmeter body 108 is provided with a longitudinal center bore 107 extending from the front side of the truncated cone shoulder 112 to the zone between cylindrical section 111 and valve disc 114. The diameter of the longitudinal bore 107 approximately equals the inside diameter of the annular magnet 110.

A cylindrical mandrel 109 plunges into the longitudinal bore 107. The front side 113 of the mandrel 109 facing the flowmeter body 108 is approximately positioned half-way of the depth of longitudinal bore 107 if a seal 115, incorporated in a groove in the outer surface 116, bears against the conical face 121. In this position, the flowmeter body 108 serves as return flow stopping device, that is, as a check valve. The other end of the mandrel 109 is held in an end plate 120 which closes off the end of the cylindrical chamber 105 to the outside and is sealed by means of a sealing ring 119. The end plate 120 is held by a cover 123 in a circular recess in basic body 101, said cover being secured to the basic body by means of screws not represented herein. A tension spring 122 rests on the front side 113 of the mandrel 109 and also on the bottom of the longitudinal bore 107. The tension spring 122 exerts a force on the flowmeter body 108 which is counteracted by the force exerted on the flowmeter body 108 by the flowing medium. FIG. 4A shows a modified arrangement with magnets 160 and 161 being substituted for the spring 122.

The mandrel 109 held in the end plate 120 is provided with a blind hole 124 extending centrally from the side opposite of the front side 113 to approximately the vicinity of front side 113, which, however, it does not reach. At the bottom of the blind hole 124, a tension spring 125 is located which, on its one side, rests on the bottom of the blind hole 124 and, on the other side, on a tube 126 inserted into the blind hole 124. The tube 126, being open on both sides, is filled with casting resin. The tube 126 contains a flux deflector 155. Near the end of tube 126 facing the tension spring 125 an NTC-resistor is positioned, the two connecting wires of which lead through the tube and are connected to a cable 128 which passes through a rubber bushing 129 located in a hole in cover 123. Furthermore, the tube contains a reed contact 130. Such reed contacts consist of a glass tube with two sealed-in, ferromagnetic reeds which open and close the contact under the influence of a magnetic field. The reed contact is filled with inert gas. The two connecting ends of the reed contact are also connected to cable 128. The reed contact is surrounded by a coil 131 the two connecting ends of which are also connected to wires of cable 128. The connecting wires of the NTC-resistor 127 may also be connected directly to the coil or the reed contact; generally, the two connecting wires of NTC-resistor are separately led to the outside and connected there to a circuit.

Cover 123 is provided with a threaded hole running in axial direction eccentrically with respect to the mean radius of tube 126. Into this threaded hole a screw 132 is inserted, the inner end of which rests on tube 126. Turning of this screw allows to shift tube 126 against the force of the tension spring 125. In this way, the reed contact 130, arranged in a fixed position in the tube, can be shifted relative to the position of the flowmeter body 108. Coil 131 may also consist of several windings which may be galvanically disconnected or connected.

Figure 8:
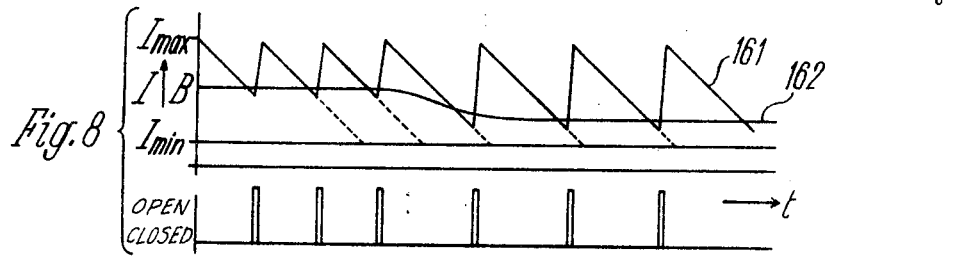

FIG. 5 shows a block diagram of a circuit in which the position of the magnet 110, herein represented as a bar magnet, is translated into a current which is measured by an indicator 141. Instead of an indicator 141 also an oscillograph or other recording instruments can be connected. Via a line 143 a power supply unit feeds a saw-tooth generator 144, an amplifier 145 and a pulse shaper 146 which, for example, may contain a capacitor discharge circuit or a single-shot multivibrator. From the two reeds of reed contact 130 two lines 147 and 148 lead to the saw-tooth generator 144 from which a control line 149 is leading to the amplifier 145. The two ends of the coil 131 are connected to amplifier 145 via feed lines 150 and 151. The proportioning pump which is not shown in this drawing is also connected to feed lines 150 and 151. Moreover, lines 147 and 148 lead to pulse shaper 146 from where a pulse line 152 leads to an integrator 153 which in the simplest case consists of a filter capacitor. Integrator 153 is connected to indicator 141 via an indicator line 154. Integrator 153 may be missing completely if, for example, indicator 141 is of the moving coil type. Saw-tooth generator 144 generates a current which initially increases steeply up to a given maximum value. Once this maximum value has been reached, the current drops steadily until the reed contact closes. The closing of the contact causes the closing curve to come to an end and results in the current rising again to the maximum value. The current generated by saw-tooth generator 144 is fed to to amplifier 145 via control line 149. Amplifier 145 feeds an amplified current having the same characteristic to coil 131. As soon as the current increases along the steep edge, the reed contact opens again. Closing of the reed contact will also energize pulse shaper 146, the latter transmitting a steady state pulse to integrator 153. Integrator 153 integrates the pulses received and feeds their mean value to indicator 141 via indicator line 154. With the circuitry outlined above the two magnetic fields, that is, the fields generated by magnet 110 and by coil 131 respectively are counter-directional at reed contact 130. In the absence of the magnetic field normally generated by coil 131, the contacts are closed in any position of magnet 110. If the strengths of the two magnetic fields are equal or differ from each other by less than the switch field strength of the reed contacts 130, said reed contacts are open. The current generated by saw-tooth generator 144 and amplified linearly by amplifier 145 is based on a constant, preset maximum value $I_{max}$ and drops linearly. The field strength of the variable magnetic field at reed contact 130 drops to the extent to which the current flow through the coil is decreasing. As soon as a value is reached at which the magnetic field generated by the coil differs from the magnetic field generated by flowmeter body 108 at reed contact 130 by an amount corresponding to the switch field strength of reed contact 130, said reed contact switches off. On the one hand this causes the dropping edge of the current generated by the sawtooth generator to end which results in a quick current rise to the value $I_{max}$. Simultaneously pulse shaper 146 is energized and, via pulse line 152, feeds a pulse to integrator 153 which, in turn, feeds a corresponding current to indicator 141 via indicator line 154. If due to a change in flow body 108 moves into the direction where the magnetic field generated by said body has a smaller influence on reed contact(s) 130, a considerable time goes by before the current through coil 131 has dropped so far that its magnetic field strength is lower than that produced by body 108 by the amount of the switch field strength at reed contact 130. Thus, the time interval between switching operations becomes greater and fewer pulses per unit time are fed to indicator 141 resulting in a lower reading. This relationship is shown in the pulse diagram in FIG. 8. Coil current I is plotted by graph 161; the magnetic field strength generated by annular magnet 110 at reed contact 130 is plotted by graph 162. The scale for current I and for the magnetic field strength of the annular magnet 110 at reed contact 130 correspond to each other so that the magnetic field strength generated by current I which is proportional to current I roughly corresponds to graph I. The respective ordinate difference between graph I and graph B corresponds to the resulting field strength at reed contact 130. The difference of the two field strengths at the switch point is constant and corresponds to the magnetic field strength at which the reed contact switches off. The lower part of the diagram in FIG. 8 shows at which field strength the reed contact switches on or off, that is, at which field strength it is closed or open.

Figure 9:
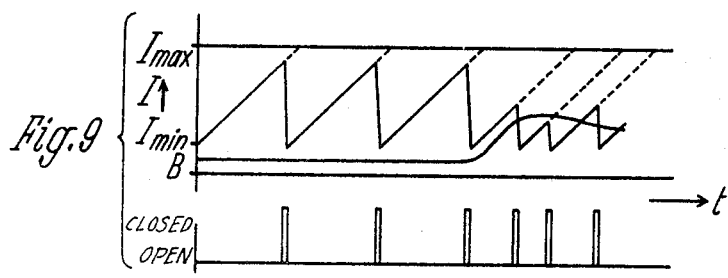

As is shown in the diagram in FIG. 9 the rising edge of the saw-tooth may be used instead of the dropping edge. In this case, the two magnetic fields at the reed contacts are unidirectional. In the absence of the magnetic field normally generated by coil 131 the contacts are open in any position of magnet 110. The current generated by the saw tooth generator begins at a minimum value $I_{min}$ and rises linearly. The strength of the magnetic field produced by the coil current rises in the same way. As soon as the two unidirectional magnetic fields generated by annular magnet 110 and by the current flowing through coil 131, respectively, reach the switch field strength of reed contacts 130 and reed contacts close. This causes a quick drop of the current generated by the saw-tooth generator to $I_{min}$ and results in a pulse being fed to the indicator. While the saw-tooth current is dropping reed contacts 130 open again. With this embodiment of the present invention each reed contact is operative if the sum of the two magnetic field strengths reaches the switching field strength, whereas, in the previous example, as shown in the diagram of FIG. 8, the reed contacts change over if the difference of the two magnetic fields reaches the switch field strength. In this case, however, the two switching field strengths differ from each other since in one case the contacts open, whereas, in the other case, they close. A higher magnetic field strength is required, however, for closing the contact than for opening. The difference between these two field strengths, also known as switching hysteresis, cannot be reduced to any desired value. Said switching hysteresis, however, is of no importance for the embodiments according to FIG. 5 as can be seen from the diagrams of FIGS. 8 and 9, since always the same switching direction is used due to the fact that always only the opening or only the closing of the contact will serve as a signal instant.

Instead of pulse shaper 146, integrator 153 and indicator 141, an electronic counter can be used, which is switched on at the beginning of the flat edge of the coil current and switched off by the change-over of the reed contacts 130. In this arrangement, the counter counts the pulses of a pulse generator of constant or variable frequency, as required. As, with linear rise or drop of the current, the time during which the counter counts, can serve as a measure for the position of the body 108, thus digital read-out of the flow rate can be obtained. Furthermore, by this method the flow value is obtained as digital value which is also suitable for further processing in process computers and the like. In the same way, a counter can be used as frequency meter measuring the number of switching operations of the reed contacts 130 per unit time. The frequency is also a measure for the position of the body 108 and, consequently, for the flow rate. If the counter counts the pulses of a pulse generator of constant frequency, said counter starts, for example, with zero and counts up, as is shown in the example in FIG. 9. According to the example shown in FIG. 8, the counter may also start with a pre-set value, if the device is designed in such a manner that the switching intervals are shorter at high flow rates than at low flow rates. After completion of the counting operation the counter is reset to the initial value to start a new counting operation.

It is also possible to feed the coil 133 with a periodically linear rising and dropping current and to determine the switching points at which the reed contact 130 changes over. The value obtained for the switching points can be used as a measure for the position of the flowmeter body 108. In this case, however, the number of switching operations of the reed contacts 130 is independent of the measured value and constantly equal to the frequency of the coil feed current. Either the distance of the cut-in or cut-out point from the upper or lower peak value of the current can be considered as a measure for the position of body 108. Yet, the ratio of cut-in time of the reed contacts 130 to cycle duration can also be used as a measure for the position of body 108. In this case, the switching hysteresis shown in graph I of FIG. 7 as an ordinate difference of the switching points is rather insignificant, since said difference is constant. In this connection, however, a linear rise and drop of the current is essential, as otherwise also the constant ordinate distance of the switching points from each other can lead to false measuring results. The minimum current $I_1$ and the maximum current $I_2$ are such that a switching operation takes place, irrespective of the position of body 108 between $I_1$ and $I_2$. In this arrangement, too, an electronic counter can be used for indicating or digitizing the measured value.

Figure 6:
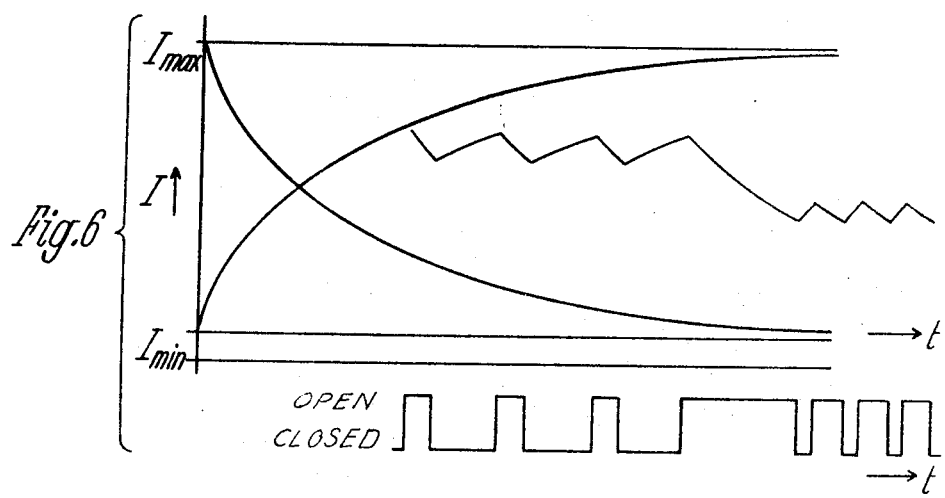
Figure 7:
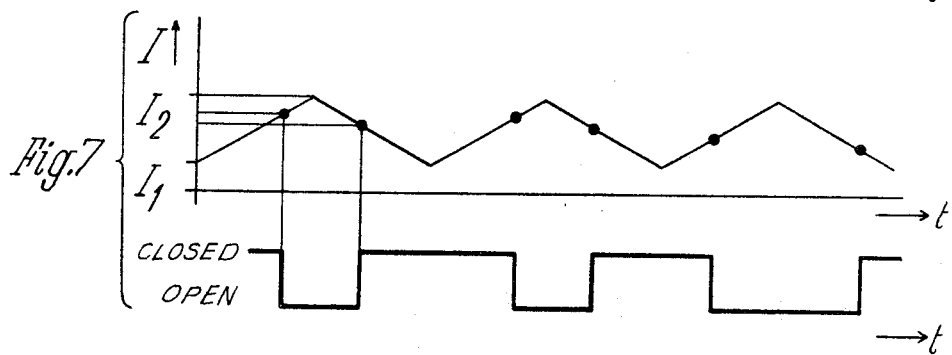

Instead of allowing the current to fluctuate between a maximum and minimum value or between a maximum and/or minimum value and a switching value, the coil can also be fed by a current that fluctuates only slightly about a mean value, said mean value being a direct measure for the position of body 108. Whereas it is expedient for the examples according to FIGS. 7 to 9 to use a power source supplying a load-independent current whose intensity is practically independent of the inductance of coil 131; in this arrangement a conventional power source, the voltage of which must not even be stabilized, can be used. Connected in series to coil 130, there is a resistor which can be shorted or connected to the circuit; the value of the resistance is practically such that, with the resistor shorted, a current $I_{max}$ flows through the coil, said current being considerably higher than the maximum current required. If the resistor is connected, the resulting current $I_{min}$ is considerably lower than the minimum current required. Upon connection or disconnection of the resistor the actual values for the current vary according to e-graphs, as shown in FIG. 6. The medium current is obtained in that the reed contacts switch off when reaching the switching point. As a result the current drops relatively quick after which the reed contacts switch on again. Consequently, the current rises again. The mean value of the current variation is a measure for the position of body 108. This arrangement practically corresponds to the system of a quick acting regulator, known as Tirill regulator in other applications. The advantage of this arrangement substantially consists in that the flow can be represented as a current. In this connection it should be considered another advantage, that, possibly, an ammeter can be directly connected to the coil circuit for indication purposes, as a slight variation of the circuit resistance is compensated by the regulator without influencing the read-out value. Regulators of this type are very simple in design and therefore very cheap.

It shall be understood that the described measuring device, which is used for controlling the proportioning pump, can also be utilized independently of the proportioning pump. In this arrangement, the flow value, displayed as electrical quantity, can optionally be indicated, registered or processed in data processing or process computer systems. A particular advantage of this measuring arrangement consists in that the flow value can be very easily translated into a digital quantity. Another advantage is that also analogue reading or recording can be very easily accomplished at low expenditure, so that the described measuring system is especially suitable for a wide field of applications. It is also advantageous that the measuring system can be very easily calibrated either by mechanically displacing the reed contacts or by applying an additional magnetic field which may, for example, be generated by a variable permanent magnet or by an additional winding. This allows in a very simple manner to shift the measured output value with respect to the position of the body 108 in such a way that the flow corresponds to a given or desired scale graduation.

It shall be understood that the present invention is not restricted to the embodiment shown by way of example and that deviations from this embodiment are possible without exceeding the scope of the invention. In particular, such deviations may result from the fact that, with some embodiments of the present invention, use is made of individual features of the invention separately or that several features of the present invention may be applied in any desired combination. For example, instead of spring 22 or tension spring 122, any desired component exerting a force on flowmeter body 8 or 108 respectively, such as a permanent magnet or electromagnet may be provided. An electromagnet offers the advantage that the exerted force may be influenced from outside in a simple manner by varying the current intensity. In this case, care should of course be taken that the field of this electromagnet does not act on reed contact(s) 130. A change in force or flux will also change the proportioning or flow characteristic of the device which therefore can also be changed in dependence of other factors or characteristics (for example, in dependence of temperature).

In embodiments functioning according to the diagrams shown in FIGS. 8 or 9, each switching cycle, for example, may result in one stroke of the proportioning pump.

If the measuring device is provided with an electronic counter, said counter may directly indicate the flow rate in cm³/sec or l/h. In this case, it is expedient that the frequency be variable and set to such a value that the desired reading is just obtained. A percent or permill reading is also possible.

If the measuring device is designed in such a manner that the time intervals between the switching cycles of the reed contacts are smaller at high flow rates than at low flow rates, the counter is allowed to count down starting, for example from 1,000. If the counting procedure is interrupted at 317 by the change-over of the reed contacts, the flow rate amounts to 31.7 percent of the maximum flow rate value.

It is expedient to set the value of the currents $I_{max}$ and/or $I_{min}$ in such a manner that the value is beyond the measuring range. Then, the counter is made to start always at the instant when the current has a value at which the reed contacts change over at zero or 100 percent flow. The counting procedure is terminated by the change-over of the reed contacts at the instant or current intensity corresponding to the respective flow rate.

Having thus fully described our invention, what we claim as new and wish to secure by Letters Patent is:

1. A proportioning device for the admixture of an additive fluid into a fluid medium flowing in a piping system with a flowmeter system installed in the piping system, a proportioning pump for discharging the additive fluid into the medium, and an additive supply system for supplying the additive fluid to the proportioning pump, the output of said proportioning pump being dependent on the flow rate of the fluid medium measured by the flowmeter system; wherein said device comprises a linearly movable body disposed within said piping system in the path of said fluid medium, biasing means arranged to bias said body in a direction generally opposite to the direction of flow of the fluid medium whereby the position of said body is dependent on the flow rate, and means for controlling said proportioning pump in response to the position of said body.

2. A proportioning device according to claim 1, wherein said biasing means is a spring means.

3. A proportioning device according to claim 2, characterized in that the proportioning pump includes a variable stroke plunger, the stroke of said plunger depending on the position of the body.

4. A proportioning device according to claim 3, characterized in that the body is arranged in a guideway so as to slide in the direction of flow and that said means for controlling said proportioning pump includes a sensing element which moves approximately perpendicularly to the body's direction of motion for sensing its position.

5. A proportioning device according to claim 4, characterized in that said body has a surface extending diagonally to the body's direction of motion, said surface operating in conjunction with the sensing element to detect the body's position.

6. A proportioning device according to claim 5, characterized in that the surface diagonal to the body's direction of motion is a conical surface.

7. A proportioning device according to claim 5, characterized in that the surface diagonal to the body's direction of motion is stepped along its axis.

8. A proportioning device according to claim 5, characterized in that the surface diagonal to the body's direction of motion is a curved surface.

9. A proportioning device according to claim 4 characterized in that a body surface diagonal to the body's direction of motion forms a stop face for limiting the stroke of the proportioning pump, said sensing element being formed by an extension of said plunger of the proportioning pump.

10. A proportioning device according to claim 3, characterized in that the body is located in a proportioning chamber which forms part of the piping system, a wall of said chamber being provided with a pump cylinder having a lip seal on the side facing the body, said lip seal enclosing in a self-sealing manner a sensing pin which is part of the means for controlling the proportioning pump, said sensing pin being formed by an extension of the pump plunger.

11. A proportioning device according to claim 2, characterized in that said pump includes a pump cylinder and in that connecting channels leading from a stroke chamber in the pump cylinder to an additive fluid cylinder are provided, the openings of said connecting channels into the stroke chamber of the pump cylinder being located near the plunger front side when the plunger is at its reversal point which is most distant from the body.

12. A proportioning device according to claim 3, characterized in that the number of strokes of the proportioning pump is controlled in dependence of a characteristic value of the medium flowing through the piping system.

13. A proportioning device according to claim 2, characterized in that said proportioning pump is driven by a lifting magnet.

14. A proportioning device according to claim 13, characterized in that said lifting magnet is controlled by a pulse generator.

15. A proportioning device according to claim 1, characterized in that the proportioning pump is equipped with a fluid drive.

16. A proportioning device according to claim 15, characterized in that the fluid drive is fed by the medium flowing in the piping system via a tapping point.

17. A proportioning device according to claim 1, characterized in that the body is designed as a check valve and in that said biasing means includes a biasing spring, said body being displaceable against the biasing spring in the direction of flow.

18. A proportioning device according to claim 1, characterized in that the means for controlling the proportioning pump includes a magnetic field which is arranged to be influenced by the position of the body,, said magnetic field being arranged to influence fixed magnetic operated contacts, and in that a variable magnetic field is also provided adjacent the contacts in superimposed relationship on the magnetic field influenced by said body.

19. A proportioning device according to claim 18, characterized in that said body is provided with a permanent magnet whose magnetic field strength at the magnetic operated contacts depends on the position of said body.

20. A proportioning device according to claim 18, characterized in that a magnetic coil is provided to produce the variable magnetic field.

21. A proportioning device according to claim 20, characterized in that the intensity of a current flowing through the coil is influenced by a control mechanism that increases the current when the contacts are closed and reduces the current when the contacts are open.

22. A proportioning device according to claim 18, characterized in that the two magnetic fields are counter-directional at the magnetic operated contacts and in that the contacts are always closed within the flow measuring range in the absence of the variable magnetic field, irrespective of the position of the body.

23. A proportioning device according to claim 22, characterized in that a magnetic coil is provided to produce the variable magnetic field and in that the intensity of a current flowing through the coil increases and decreases periodically.

24. A proportioning device according to claim 23, characterized in that the coil current increases and decreases at constantly varying time intervals.

25. A proportioning device according to claim 23, characterized in that the coil current characteristic follows the shape of a saw-tooth with a very steep edge.

26. A proportioning device according claim 23 characterized in that the ratio of the closing time of the magnetic operated contacts to the cycle duration of the coil current is used as a measure for the flow rate.

27. A proportioning device according to claim 23, characterized in that the direction of variation of the coil current intensity changes when the contacts change over.

28. A proportioning device according to claim 27, characterized in that the frequency of the switching cycles of the magnetic operated contacts is used as a measure for the flow rate.

29. A proportioning device according to claim 28, characterized in that a frequency meter serves to determine the flow rate value.

30. A proportioning device according to claim 18, characterized in that the two magnetic fields are unidirectional at the magnetic operated contacts and in that said contacts are always open within the flow measuring range in the absence of the variable magnetic field, irrespective of the position of the body.

31. A proportioning device according to claim 18, characterized in that the body is supported in its direction of motion by a cylindrical mandrel coaxial to a measuring chamber, said mandrel being arranged to plunge into a concentric blind hole in the body.

32. A proportioning device according to claim 31, characterized in that the magnetic operated contacts are longitudinally displaceably arranged in the mandrel within a longitudinal bore provided in the mandrel.

33. A proportioning device according to claim 32, characterized in that a coil producing the variable magnetic field is located in the longitudinal bore of the mandrel.

34. A proportioning device according to claim 31, characterized in that the longitudinal axis of the mandrel is inclined towards the direction of flow of the fluid medium.

35. A proportioning device according to claim 34, characterized in that the magnetic operated contacts are slidably arranged in the body's direction of motion.

36. A proportioning device according to claim 18, characterized in that at least one flux deflector is provided at the magnetic operated contacts to deflect the magnetic flux towards respective contacts.

37. A proportioning device according to claim 1, characterized in that both the quantity delivered per working cycle of the proportioning pump and the number of working cycles of the proportioning pump per unit time depend on the position of the body.

38. A proportioning device according to claim 1, wherein said biasing means includes magnetic field producing means.

* * * * *